United States Patent [19]

Gamell

[11] 4,378,195

[45] Mar. 29, 1983

[54] PRESSURE FLUID MOTOR

[75] Inventor: Joseph A. Gamell, Kalamazoo, Mich.

[73] Assignee: Joseph Gamell Industries, Inc., Kalamazoo, Mich.

[21] Appl. No.: 936,326

[22] Filed: Aug. 24, 1978

Related U.S. Application Data

[63] Continuation-in-part of Ser. No. 749,612, Dec. 10, 1976, abandoned.

[51] Int. Cl.³ .............................................. F03B 5/00
[52] U.S. Cl. ...................................... 415/90; 415/202
[58] Field of Search ...................... 415/75, 76, 90, 92, 415/202

[56] References Cited

U.S. PATENT DOCUMENTS

| | | | |
|---|---|---|---|
| 158,579 | 1/1875 | Fairfax | 415/76 |
| 760,776 | 5/1904 | Campbell | 415/90 |
| 778,928 | 1/1905 | Webb | 415/75 |
| 981,311 | 1/1911 | Rivers | 415/76 |
| 1,902,439 | 3/1933 | Foss | 415/75 |
| 2,325,530 | 7/1943 | Meredith | 415/90 |
| 2,436,246 | 2/1948 | Braga | 415/75 |
| 3,800,528 | 4/1974 | Gamell | 415/90 |
| 3,967,914 | 7/1976 | Gamell | 415/90 |

FOREIGN PATENT DOCUMENTS 293457 2/1932 Italy ...................................... 415/75

OTHER PUBLICATIONS

IBM Technical Disclosure Bulletin, vol. 9, No. 2, Jul. 1966.

Primary Examiner—Leonard E. Smith
Attorney, Agent, or Firm—Gordon W. Hueschen

[57] ABSTRACT

A pressure fluid motor adapted to be operated by compressed air, steam, or hydraulically, comprising a cylindrical housing having a smooth inner surface and a concentric cylindrical rotor having a roughened surface provided with inlet means for introducing the pressure fluid into the space between the rotor and the housing and outlet means remote from the inlet means for venting spent pressure fluid whereby the pressure fluid is induced to flow through the motor in a vortex path. The clearance between the rotor and the housing is from about 0.0075 to about 0.03 inches.

6 Claims, 9 Drawing Figures

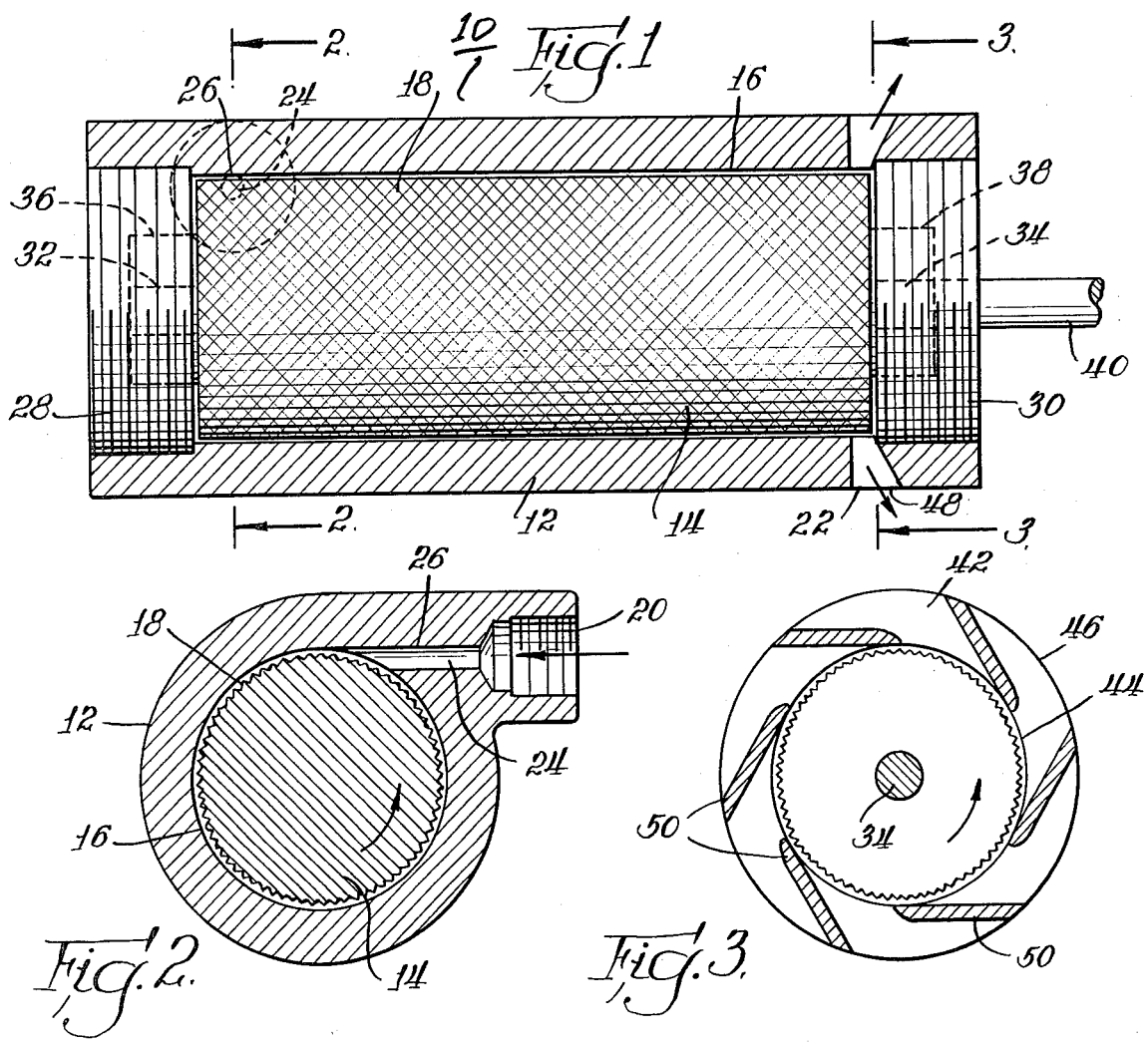
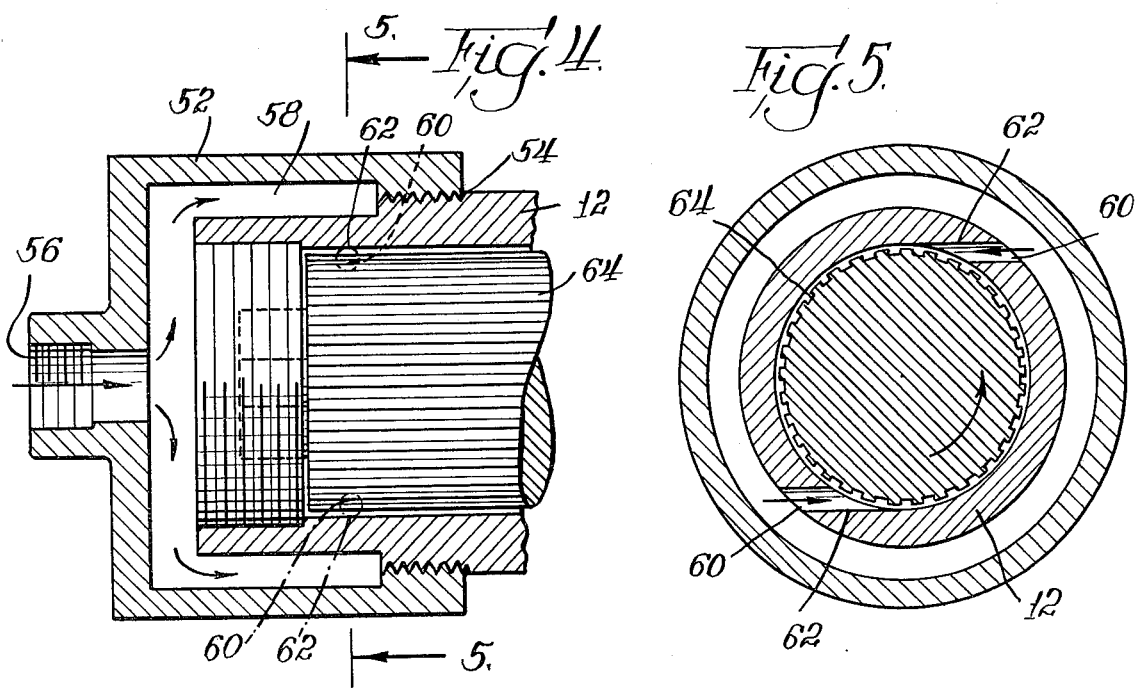

PRESSURE FLUID MOTOR

This is a continuation-in-part of application Ser. No. 749,612, filed Dec. 10, 1976, now abandoned.

BACKGROUND OF THE INVENTION

1. Field of Invention

The invention relates to pressure fluid motors adapted to be motivated by compressible fluid such as air or steam or hydraulic fluid such as water. More particularly, the invention relates to pressure fluid motors which comprise a housing and a rotor therein coupled with means to cause the pressure fluid to pass along the rotor in the space between the rotor and the housing in a vortex which may be either spiral or helical.

2. Prior Art

Pressure fluid motors of the class described are found in U.S. Pat. No. 3,967,914 and patents cited during the prosecution thereof, to wit, U.S. Pat. Nos. 2,325,530; 778,928; 551,853; 158,579; 68,325; and 981,311. Each of U.S. Pat. Nos. 778,928; 551,853; 158,579; and 981,311 are characterized by complementary grooves or channels on the rotor and the housing. U.S. Pat. No. 68,325 is characterized by channels in the housing to direct helical flow of the fluid. U.S. Pat. No. 3,967,914 is characterized by a knurled rotor and an oblique helix in the housing to cause oblique helical flow through the motor. U.S. Pat. No. 2,325,530 shows a rotor having a narrow knurled band with means in the housing for impinging pressure fluid on the knurled portion of the rotor.

OBJECT OF THE INVENTION

It is an object of the invention to provide a new and improved pressure fluid motor. It is a further object of the invention to provide a pressure fluid motor of improved efficiency. It is a further object of the invention to provide a pressure fluid motor which is economical to manufacture.

Further objects of the invention are to avoid the disadvantages of the prior art and obtain such advantages as will appear as the description proceeds.

SUMMARY OF THE INVENTION

The invention relates to a pressure fluid motor comprising a housing of circular cross-section having a smooth, non-channeled, inner surface; a rotor concentric with said housing and having a roughened, non-channeled, outer surface, with the rotor and the housing being complementary in shape and having a clearance of from about 0.0075 to not more than about 0.03 inches; a jet orifice for introducing a pressure fluid jet into the space between the housing and the rotor; an outlet means for venting spent pressure fluid, with the jet orifice having its outermost surfaces tangential to the smooth inner surface of the housing and a diameter greater than the clearance between the housing and the rotor, so that a portion of a jet is jetted directly and tangentially into the space between the rotor and the housing, whereas the balance of the jet is deflected by the rotor into the space between the rotor and the housing so that the jet, which initially has a diameter larger than the space between the housing and the rotor, is flattened to a thickness corresponding to the spacing between the housing and the motor and follows the inner surface of the housing in a free unchanneled vortex which imparts energy to the rotor by the drag of the vortex on the roughened surface of the rotor.

Advantageously, the inlet means is adjacent one end and the outlet means is adjacent the other so that maximum contact of pressure fluid with the rotor is obtained. Also advantageously, the inlet means comprises nozzles, the outermost surface of which is tangential to the inner surface of the housing. Also, it is of advantage to provide a manifold having an inlet port communicating with the nozzles, in which case, it is of advantage that the inlet port be axially disposed and that the manifold be concentric with the cylinder. Advantageously, the nozzle means comprises one or a plurality of cylindrical bores extending through the housing with the outer element or surfaces of the bore relative to the axis of the housing being tangential to the inner surface of the housing. The bore, however, can be elongated axially to a prolate form, considering the axis to be oriented in the same direction as the axis of the rotor. It can also be rectilinear as well as curvilinear.

It is also of advantage that the clearance be in the order of about 0.015 inches, since a departure from this either way causes a loss of efficiency, at least in a small motor such as can readily be held in the hand.

BRIEF DESCRIPTION OF THE DRAWINGS

In the drawings:

FIG. 1 is a side elevation taken in partial section.
FIG. 2 is a cross-section taken on line 2—2 of FIG. 1.
FIG. 3 is a cross-section taken on line 3—3 of FIG. 1.
FIG. 4 is a modified form of the invention, the view corresponding to that of FIG. 1.
FIG. 5 is a cross-section taken along line 5—5 of FIG. 4.

DETAILED DESCRIPTION OF THE INVENTION

Figure 6:
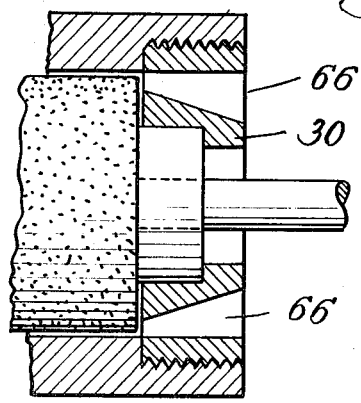
FIG. 6 is a modified form of the invention, the view corresponding to that of FIG. 1.

Referring now particularly to FIGS. 1, 2, and 3, there is shown a pressure fluid motor 10 having a housing 12 and a rotor 14. The housing has a smooth inner surface 16 and the rotor has a knurled outer surface 18.

The motor is provided with inlet means 20 and outlet means 22. The inlet means comprises a bore 24 opening into the housing 12. The bore 24 is cylindrical and has its outermost element or surface 26 (i.e., outermost with reference to the axis of the housing) tangential to the inner surface of the housing, as shown in FIG. 2.

The bore 24 has a diameter substantially greater than the clearance between the housing and the rotor, advantageously, at least two, but not more than four times greater. If the bore is in the prolate form instead of being cylindrical, the diameter is to be understood to be the radial dimension, i.e., the lesser axis of the prolate form. As a result, the upper portion of the jet following the outermost surface or element 26 is directed tangentially into the space between the smooth, inner surface of the housing and the roughened, outer surface of the rotor, whereas the lower portion of the jet directly impinges on the roughened surface of the rotor. Thus, energy is imparted to the rotor not only by the drag effect of the pressure fluid traveling along the smooth inner surface of the housing, but also by the reaction of the portion of the jet which impinges on the rotor. When the rotor is rotating, the roughened surface acts as a drag to drag in the lower portion of the jet and to flatten the jet out to a thickness corresponding to the clearance between the rotor and the housing. Due to this flattening-out effect, and due to expansion, if an expansible fluid is used, causes the jet to flare out, so that a large portion of the surface of the rotor is subjected to the drag effect of the pressure fluid as it travels along the smooth, unchanneled, inner surface of the housing in a vortex.

The housing has suitable end closures 28 and 30 which may be threaded or otherwise securely mounted in the housing. The rotor has two trunnions 32 and 34 journaled in bearings 36 and 38. The trunnion 34 is extended to provide a drive shaft 40. The bearings may be roller bearings, ball bearings, or self-lubricating bearings of sintered or porous metal or of nylon or Teflon TM.

The vents 22 provide a plurality of apertures 42 which are elongated at the inner surface of the housing as shown at 44 and flare outwardly as shown at 46 and 48. The apertures 42 are separated by a plurality of vanes 50. This arrangement is of advantage where an expandable pressurized fluid such as air or steam is used because it allows for expansion of the exiting pressure fluid.

Referring now particularly to FIGS. 4 and 5, there is shown a modification in which the inlet means comprises a manifold 52 which is concentric with the housing 12 and secured thereto by any suitable means such as the threads 54. The manifold 52 comprises an axial inlet port 56 and provides a circumferential channel 58 which communicates with the nozzles 60. These nozzles 60 are bores extending through the housing 12 with the outermost element 62 of bores 60, that is, outermost with reference to the axis of the housing, tangential with the inner surface of the housing.

In accordance with the modification shown in FIGS. 4 and 5, the roughened surface is obtained by adjacent, parallel grooves 64 which extend the full length of the rotor, as does the knurling of FIGS. 1, 2, and 3.

In FIG. 6 there is shown a modification in which the spent pressure fluid is vented through vents 66 in the end piece 30. These vents flare out as shown to allow for expansion of the exiting pressure fluid.

Figure 7:
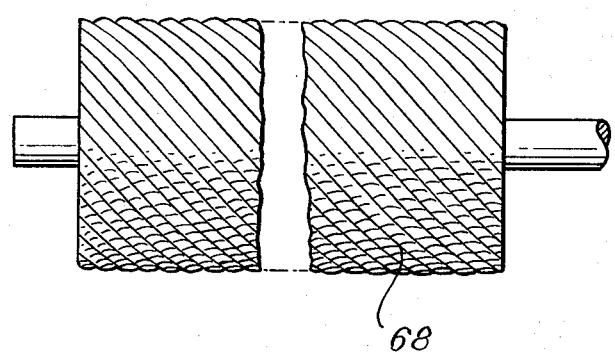
FIG. 7 is a modified form of the rotor.

In FIG. 7 there is shown a modification in which the roughened surface is provided by adjacent, parallel helical grooves. The helical grooves shown are a reverse helix with respect to the vortex. In other words, the grooves spiral around the rotor in one direction, whereas the pressure fluid spirals around the rotor in the opposite direction.

Figure 8:
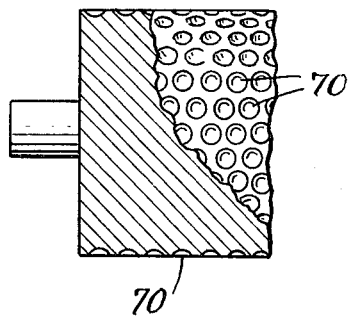
FIG. 8 is another modified form of the rotor.

In FIG. 8 is shown a further modification in which the roughened surface is obtained by providing a multiplicity of adjacent unconnected depressions 70. These depressions may be indentations like the indentations on a golf ball or simply blind holes bored in the surface of the rotor.

Figure 9:
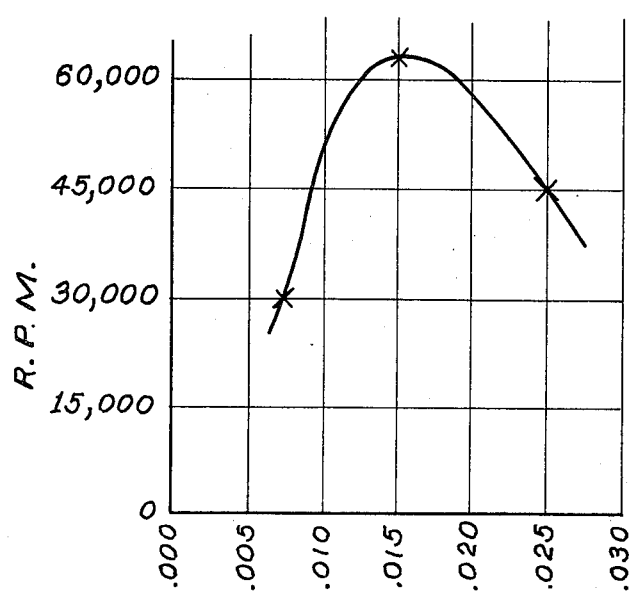
FIG. 9 is a graph showing the effect of the clearance on the velocity obtainable.

Whereas in the prior art it has heretofore been considered necessary to provide the housing of a rotary motor of the type here involved with grooves or channels to direct the flow of the pressure fluid therein, or to provide grooves or channels in the rotor for the same purpose, it has been found in accordance with the invention that such channels or grooves can be entirely eliminated provided a close tolerance is maintained in the clearance between the rotor and the housing. The effect of this variation in this clearance is shown in FIG. 9 where at a clearance of about 7.5/1000s of an inch, an rpm of 30,000 was obtained and at 25/1000s of an inch, an rpm of 45,000 was obtained as compared with an rpm of 60,000 at a clearance of 15/1000s of an inch. Thus, applicant's invention as compared with the prior art has the advantage of greater simplicity of construction and therefore greater economy of manufacture, coupled with high efficiency, as shown by the graph in FIG. 9. The data shown in FIG. 9 was obtained with a motor having a standard knurled surface impressed therein with a standard knurling tool and a diameter of one and one-half inches using compressed air at 60 psi gauge.

As illustrated, the rotor comprises a solid metal rotor which may be of aluminum or other suitable metal. It will be understood, however, that the rotor may be made hollow, if desired, in order to increase its moment of inertia. It is to be understood also that the rotor, if desired, may be constructed of high-impact plastic or that the whole device may be constructed of a high-impact plastic according to the particular use to which the device is to be applied. Any suitable machinable plastic such as nylon, polycarbonate, or Teflon TM (polytetrafluoroethylene), can be used for this purpose. Advantageously, the housing can be made of such plastic, especially Teflon TM, or just lined therewith, in order to reduce the friction between the fluid vortex and the housing.

It will be understood, also, that while the jet orifice has been illustrated as being disposed at one end of the housing, it could be disposed in the center of the housing or at some intermediate portion, as long as means is provided to vent the spent pressure fluid from both ends of the housing.

It is to be understood that the invention is not to be limited to the exact details of operation or structure shown and described, as obvious modifications and equivalents will be apparent to one skilled in the art.

I claim:

1. A pressure fluid motor comprising a housing of circular cross-section having a smooth, non-channeled, right-cylindrical, inner surface; a rotor concentric with said housing and having a roughened, non-channeled, right-cylindrical, outer surface, said rotor and said housing being complementary in shape and having a relatively-small, uniform clearance throughout the axial extent of said rotor and said housing; a jet orifice for introducing a pressure fluid jet into the space between said housing and said rotor; and, outlet means for venting spent pressure fluid, said jet orifice having its outermost surface tangential to the smooth, non-channeled, right-cylindrical, inner surface of said housing and a diameter greater than the clearance between said housing and said rotor, whereby a portion of said jet is jetted directly and tangentially into the space between said rotor and said housing and the balance of the jet impinges on the roughened, non-channeled, right-cylindrical surface of said rotor and is deflected by said rotor into the space between said rotor and said housing so that the jet, which initially has a diameter larger than the spacing between said housing and said rotor, is flattened to a thickness corresponding to the spacing between said housing and said rotor and fans out over the smooth, unchanneled, right-cylindrical, inner surfaces of said housing and said rotor in a free, unchanneled, fan-shaped stream, the clearance between said housing and said rotor being such that said stream imparts energy to said rotor by the drag of said stream on the roughened surface thereof, and by the lack of drag on the smooth, unchanneled, right-cylindrical, inner surface of said housing, and by its freedom for both circumferential and axial expansion.

2. The motor of claim 1, in which the roughened surface of said rotor is a knurled surface.

3. The motor of claim 1, in which the roughened surface comprises a plurality of adjacent, parallel axial grooves.

4. The motor of claim 1, in which the roughened surface comprises a multiplicity of adjacent unconnected depressions.

5. The motor of claim 1, in which the housing rotor and the housing are relatively long, as compared with the diameter of the rotor.

6. The motor of claim 5, in which the jet orifice is located at a point remote from the outlet means, whereby the jet fluid is constrained to flow in a helical path along the smooth, unchanneled, right-cylindrical, inner surface of the housing from the jet orifice to the outlet means.

* * * * *